(12) United States Patent
Stumpe et al.

(10) Patent No.: US 6,601,443 B1
(45) Date of Patent: Aug. 5, 2003

(54) INTEGRATED SUBASSEMBLY MOUNTABLE ON THE STEERING COLUMN OR ON THE STEERING WHEEL OF A MOTOR VEHICLE

(75) Inventors: Reinhard Stumpe, Neuhausen (DE); Walter Hecht, Bietigheim-Bissingen (DE); Rudolf Klein, Lauffen a. N. (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 0 days.

(21) Appl. No.: 09/101,458

(22) PCT Filed: Jan. 11, 1997

(86) PCT No.: PCT/EP97/00112

§ 371 (c)(1),
(2), (4) Date: Aug. 30, 1999

(87) PCT Pub. No.: WO97/26154

PCT Pub. Date: Jul. 24, 1997

(30) Foreign Application Priority Data

Jan. 20, 1996 (DE) .......................................... 196 02 060

(51) Int. Cl.⁷ .............................................. G01M 19/00
(52) U.S. Cl. ..................................................... 73/118.1
(58) Field of Search ............................. 73/118.1, 116, 73/862, 862.08, 862.041; 439/15, 164; 180/79.1, 444; 250/231.17; 33/1 R, 1 N, 1 PT

(56) References Cited

U.S. PATENT DOCUMENTS

| | | | |
|---|---|---|---|
| 4,867,688 A | | 9/1989 | Suzuki |
| 5,004,915 A | * | 4/1991 | Umehara et al. ...... 250/231.14 |
| 5,088,319 A | * | 2/1992 | Hirose et al. .............. 73/118.1 |
| 5,174,425 A | * | 12/1992 | Takahashi et al. ........... 73/1.75 |
| 5,218,769 A | * | 6/1993 | Tranchon .................... 33/1 PT |
| 5,243,188 A | * | 9/1993 | Hattori et al. ......... 250/231.17 |
| 5,248,939 A | * | 9/1993 | Brauer ........................ 324/174 |
| 5,309,758 A | * | 5/1994 | Kubota et al. ............. 73/118.1 |
| 5,314,344 A | | 5/1994 | Ida et al. |
| 5,732,790 A | * | 3/1998 | Endo et al. .................. 180/444 |
| 5,787,375 A | * | 7/1998 | Madau et al. ................. 701/41 |
| 6,155,106 A | * | 12/2000 | Sano .......................... 73/118.1 |
| 6,282,968 B1 | * | 9/2001 | Sano et al. .............. 73/862.08 |

FOREIGN PATENT DOCUMENTS

| | | |
|---|---|---|
| DE | 4229610 | 6/1993 |
| DE | 4300663 | 6/1994 |
| DE | 4409892 | 9/1995 |
| DE | 19511693 | 11/1995 |
| DE | 19515423 | 11/1995 |
| DE | 4427883 | 12/1995 |
| DE | 4428883 | 12/1995 |
| EP | 675023 | 10/1995 |
| EP | 680850 | 11/1995 |
| WO | 97/26154 | 7/1997 |

OTHER PUBLICATIONS

Search Report of the German Patent Office Relating to Parent German Patent Application 19602060.3 filed Jun. 11, 1996.
English translation of the International Preliminary Examination Report for PCT/EP97/00112.

* cited by examiner

Primary Examiner—Eric S. McCall
(74) Attorney, Agent, or Firm—Paul Vincent

(57) ABSTRACT

This invention relates to an integrated sub-assembly for installation of a steering column and/or steering wheel of an automatic vehicle. A plurality of building units arranged in the area of the steering column and/or steering wheel are integrated with each other in terms of space for purpose of simplified manufacture and assembly so that, in this way, it is possible to economize on housing walls as well as on mechanical and electrical interfaces. Advantageous further developments deal with the drive of components within the building units by the steering wheel.

5 Claims, 4 Drawing Sheets

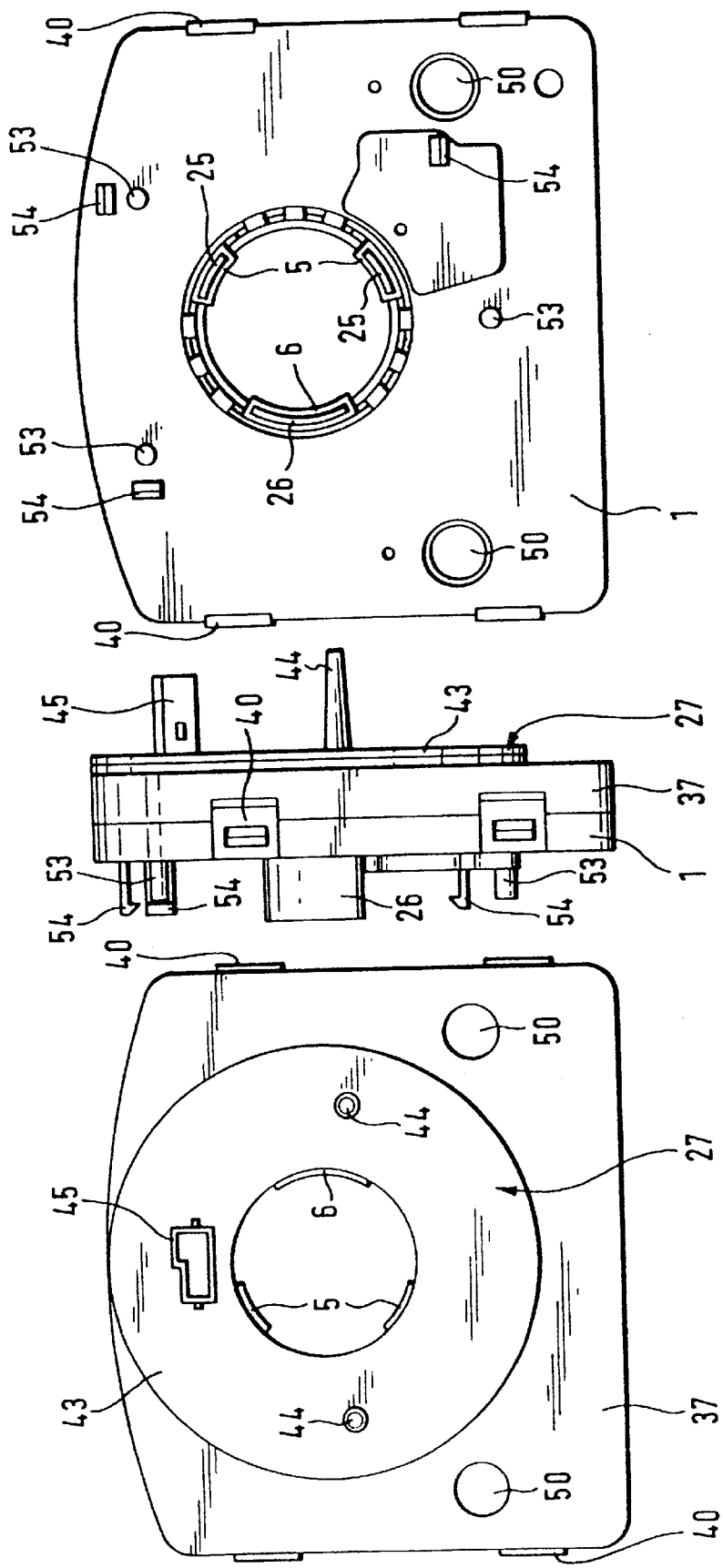

INTEGRATED SUBASSEMBLY MOUNTABLE ON THE STEERING COLUMN OR ON THE STEERING WHEEL OF A MOTOR VEHICLE

TECHNICAL FIELD

This invention relates generally to angle sensors and more particularly to angle sensors used to sense the wheel angular position of a vehicle steering wheel.

BACKGROUND OF THE INVENTION

In automotive vehicles, subassemblies are installed which feature more and more electric circuitry serving the safety and/or the comfort or relief of the driver. ABS, slip control and yawing moment control are examples in this respect. Thus, electronic subassemblies constitute an ever increasing part in the manufacture and price formation of the vehicles. Therefore, endeavors are made to integrate more and more subassemblies with each other in order to reduce assembly steps and costs.

In addition to the prior art steering column switches, in the area of the steering wheel/steering column of a vehicle, there have been added devices for heating the steering wheel, the airbag, the hazard warning signal flasher, the steering angle sensor and the transmission device for supplying electric power to the subassemblies, flanged to the rotating steering wheel, from the electric power supply unit assembled fast with the chassis. The appropriate subassemblies are supplied by different manufacturers in separate housings which, then, are stacked on top of one another and are connected with one another both mechanically and electrically. Consequently, a series of mechanical and electrical interfaces results which not only are expensive to manufacture but which also require a comparatively large space and considerable effort and cost for the coordinating and tolerance rating of the individual subassemblies.

It is thus an object of this invention to suggest measures for simplifying the manufacture and assembly efforts of the subassemblies installed in the area of the steering column/steering wheel.

This invention consists in the constructional combination of the transmission unit and of the steering angle sensor in that one housing part of the electric power transmission unit simultaneously forms a housing part of the steering angle sensor. In an integrating process, it is, in principle, possible to proceed in such a manner as to captively support both the rotatable code disk and the rotatable lid of the electric power transmission unit each in one housing half and to then close the two housing halves, with the rotating parts facing each other, so that they are accommodated in a joint housing shut off against the outside. In doing so, however, attention has to be paid to the fact that the drive of the components to be rotatably driven, the code disk and the connection device for the airbag contacts, has to be effected via the cylindrical center aperture of the subassemblies in the area of the steering column. In order to have sufficient space for the mechanical and electrical interfaces of the electric power transmission unit, the individual units such as electric power transmission unit and steering angle sensor are placed on top of each other so that the lid of the one unit simultaneously at least forms one part of the bottom of the unit lying on top thereof. The inventive system, moreover, grants full freedom as regards whether or not all the units belonging to the system are actually installed. For instance, it is possible to install the electric power transmission unit even without the steering angle sensor by only mounting an appropriate bottom part instead of the steering angle sensor. As it must be taken into account that more and more subassemblies will be integrated into the steering wheel in order to achieve a simplified operability of the instruments and improve the safety of the vehicle, it is preferred to have the electric power transmission unit directly connected to the steering wheel while it will be possible to selectively couple the following building units to the transmission unit, with a steering column switch being coupled to the electric power transmission unit in addition to the steering angle sensor or instead of the same.

In a preferred embodiment, building units are arranged centrally relative to the steering column. The individual subassemblies essentially feature the shape of hollow annular bodies that may be inserted into, or rather interlocked within, each other or just be stacked on top of each other. As far as the housing lid must be rotatable relative to the housing bottom lying beneath it such as is the case with regard to the lid of the electric power transmission unit the locking system should be chosen so as to keep the lid rotatable relative to the bottom. This may be done, e.g., by providing a surrounding groove in the lid engaged by an appropriate projection of the bottom.

A steering angle sensor can be one of the building units. This enables the code disk to be directly driven by the steering wheel in a relatively simple way. With the housing lid being formed by the lid of the electric power transmission unit, a dual function will be achieved as the lid serves as mechanical and electrical interface, on the one hand, and simultaneously drives the code disk of the second-building-unit steering angle sensor placed underneath thereof, on the other hand.

In a further embodiment, a steering column switch is selected as a building unit into the subassembly in addition to the steering angle sensor. The steering column switch, too, is provided with elements actuatable by the rotation of the steering wheel such as the reset cam of the direction indicator reset device. The mode of operation of such a resetting action is described for instance in the applicant's patent application P 44 18 328.3. Thus, e.g., the lid of the electric power transmission unit cannot only drive the code disk of the steering angle sensor but also the reset cam of the steering column switch. It is thus recommendable to coordinate the design of the housing parts so that either the tongue of the electric power transmission unit will drive both the code disk of the steering angle sensor and the reset cam of the steering column switch or so that the steering angle sensor is dispensed with and the electric power transmission unit, without any constructional change to it, will only drive the reset cam of the steering column switch in case there is no need for a steering angle sensor in the vehicle. As a result, this means that the housing lid of the steering column switch should feature the same configuration as the lid of the steering angle sensor so that the steering angle sensor and the steering column switch are interchangeable relative to the electric power transmission unit.

Preferably, the steering column switch is located beneath the steering angle sensor and the electric power transmission unit. As in many cases, however, no use is made of a steering angle sensor it may likewise be expedient to design the steering column switch so as to enable additional assembly of the steering angle sensor beneath the steering column switch in case of demand.

Preferably, at least two building units are jointly activated by one drive segment coupled to the steering wheel. The use of one drive segment can be achieved by using an actuating tongue to drive both the code disk of the steering column switch and the reset cam of the steering column switch.

BRIEF DESCRIPTION OF THE DRAWINGS

FIGS. 4 through 6 are a top view, side view and bottom view of the subassembly in accordance with FIG. 1.

DETAILED DESCRIPTION OF THE PREFERRED EMBODIMENTS

Regarding the building unit of a steering angle sensor, the subassembly described in this example of an embodiment and consisting of two building units was described in detail in the applicant's patent application P 8637 and is therefore to be explained in this description only in so far as it is necessary for the inventive integration of the individual building units.

Figure 1:
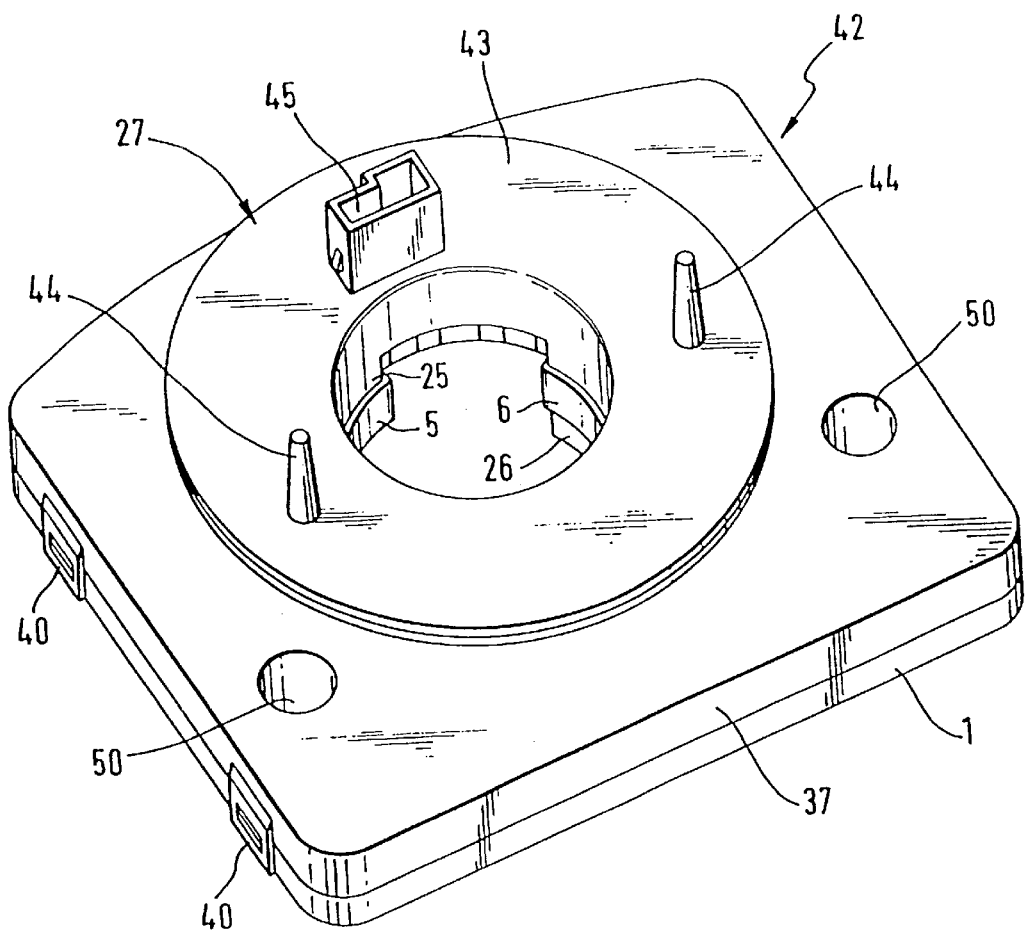
FIG. 1 is a top view on an integrated subassembly including two building units.
Figure 2:
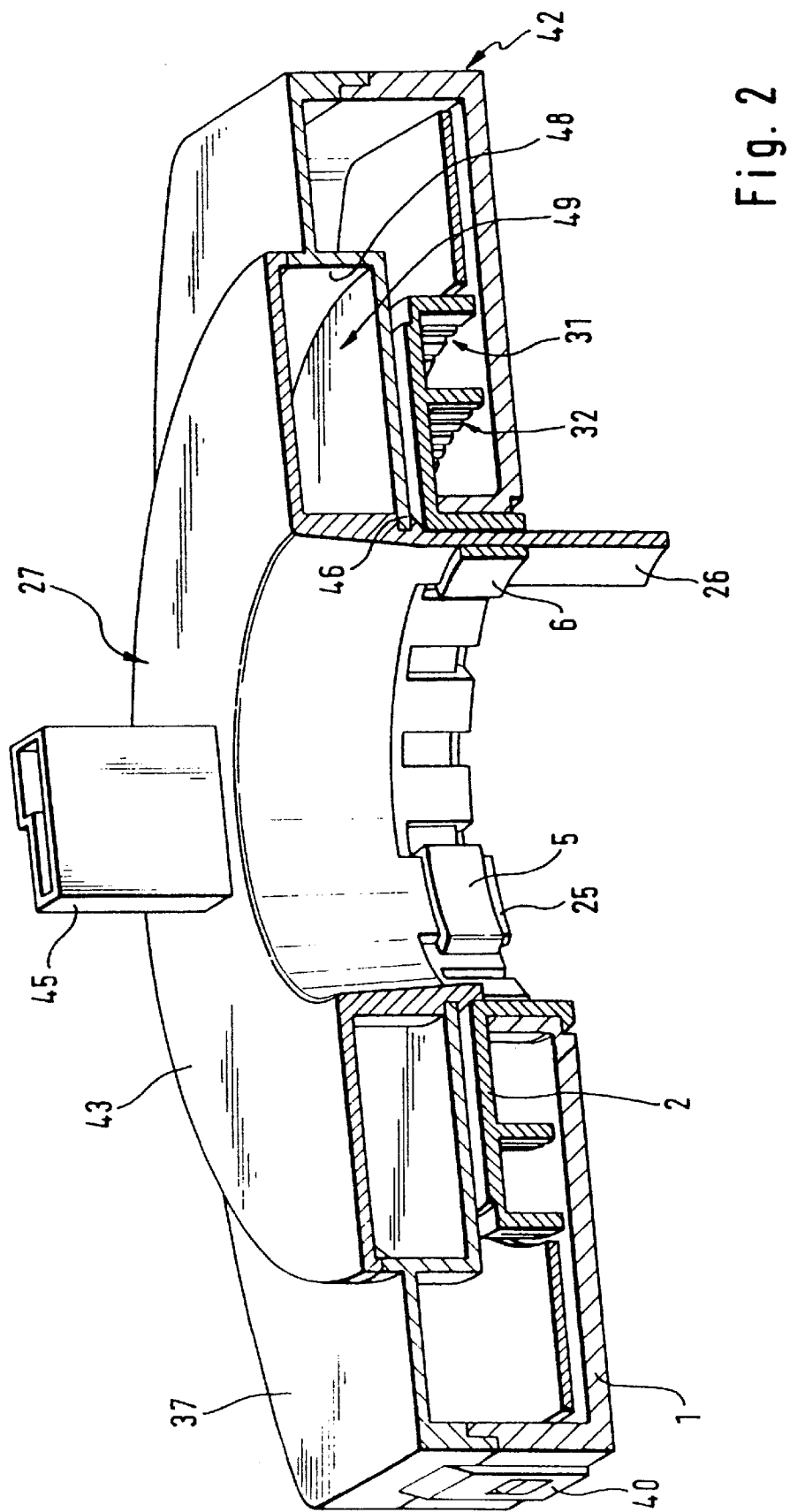
FIG. 2 is a section through the subassembly of FIG. 1.
Figure 3:
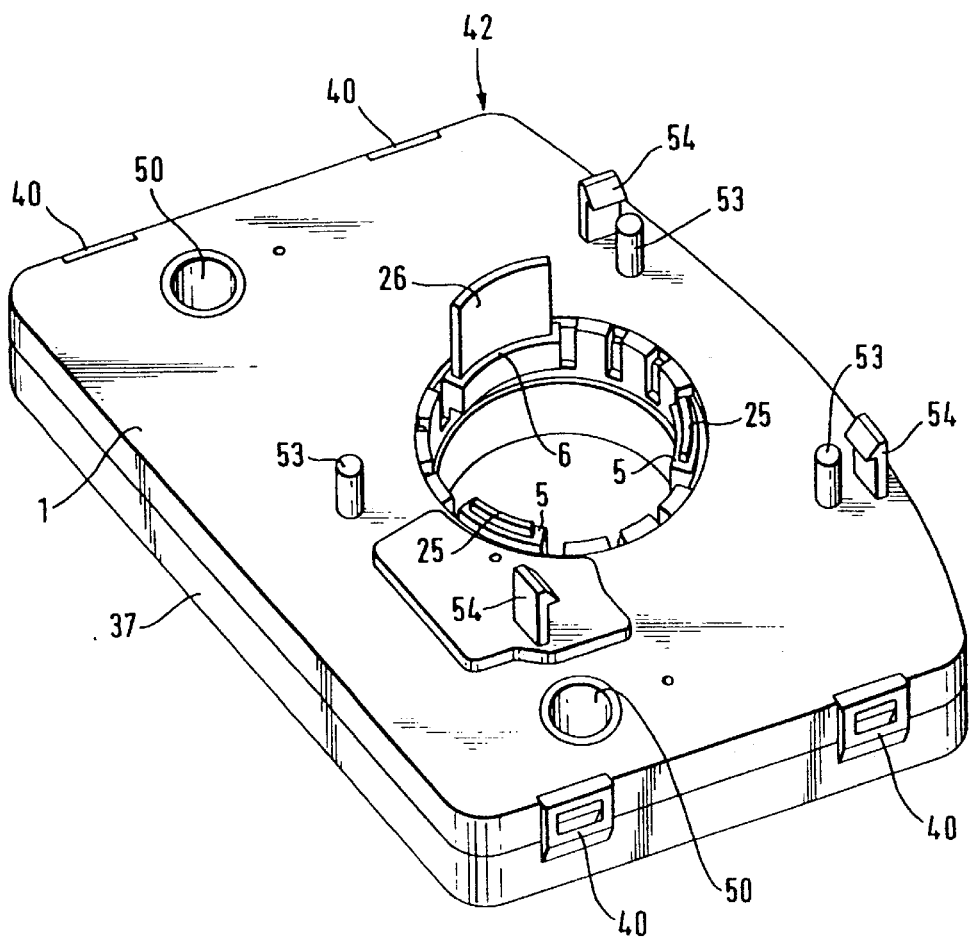
FIG. 3 is a perspective bottom view from of the subassembly of FIG. 1.

The building unit as per FIGS. 1 through 6 consists of a transmission unit 27 and of a steering angle sensor 42 the housing halves of which are interlocked. The housing lid 43 of the transmission unit 27 has two driving pins 44 directly coupled to the steering wheel so that the housing lid 43 will follow the rotation of the steering wheel. An airbag plug 45 provides electric contact between the airbag (not represented) within the steering wheel and the housing lid 43.

The housing lid 43 is seated above the housing lid 37 of the steering angle sensor 42, the housing lid 37 being mounted fast relative to the chassis of the vehicle. Contrary thereto, the housing lid 43 is rotatable relative to the housing lid 37. The rotatable support is made by means of a rotatable click-in lock 46 where a surrounding groove in an annular wall of the housing lid 43 cooperates with a respective projection on the housing 37 of the steering angle sensor 42. Of importance for this invention is that the housing lid 37 of the steering angle sensor 42 has an annular clearance 48 which, together with the lid 43, procures an annular space 49 which may serve to receive a spiral spring or a sliding contact device of the transmission unit 27. It thus is evident that the lid 37 of the steering angle sensor at least in part forms the bottom of the annular space for the transmission unit. The housing lid 37 is connected with the housing bottom 1 of the steering angle sensor by way of a snap fit which is done by means of the click-in springs 40 (see FIGS. 2, 5, 6). Rotatably supported within the housing of the steering angle sensor, on the housing bottom of this sensor, is a code disk 2. Details in this respect are described in applicant's patent application P 8637. Regarding the present invention it is, however, of importance that downwardly-projecting transport tongues 25, 26 of the transmission unit 27 engage transport loops 5, 6 of the code disk and rotatingly drive the same so as to rotate in the sense of a rotary movement of the housing lid 43. Of further importance for this invention is that the broad tongue 26 projects considerably downwards beyond the housing bottom 1 of the steering angle sensor. The purpose of this measure is to also drive a reset cam (not represented) of a steering column switch, added to the housing bottom 1, by means of the free end of the tongue 26 so that the driving pins 44 of the housing lid 43 do not only drive the code disk of the steering angle sensor but also the reset cam of the non-represented steering column switch. In the present example, the non-represented steering column switch is connected with the housing of the steering angle sensor 42 in a simple manner by means of screws. Serving this purpose are the two screw holes 50 which receive screws, e.g., proceeding from the steering wheel and screwed to the non-represented housing of the steering column switch. Of course, it will be within the scope of this invention to also link the switch housing with the housing of the steering column switch or the bottom of the transmission unit 27 by means of a snap fit. Centering pins 53 or lugs 54 serve to center and retain the lid of the non-represented steering column switch.

A further possibility of integration consists in integrally shaping to the housing lid 43 of the transmission unit 27 the tracks, such as the code track 31 and/or the incremental track 32, required for the determination of the angle of rotation of the steering wheel. The housing lid 43 of the transmission unit thus simultaneously acts as a code disk so that in this arrangement it is possible to do without the assembly of a separate code disk. In this case, the lid 43 of the transmission unit 27 is rather arranged rotatably relative to the housing bottom 1 of the steering angle sensor. The lid 43 may be supported rotatably on the housing bottom 1 in the same manner as the code disk 2. It may also be possible to maintain the rotatable support of the housing lid 43, described further above, relative to the housing lid 37 of the steering angle sensor. Moreover, if need may be, it is in the here-described design also possible to do without the non-rotatable housing lid 37 of the steering angle sensor so that the overall housing of the unit including transmission unit and steering angle sensor essentially consists of the rotatable housing lid 43 with code tracks and of the housing bottom 1 of the steering angle sensor. A part of the thus enclosed space will then be:needed for the duties of the transmission unit such as for receiving a spiral spring or for contact paths and associated sliding contacts. In this integrated design it is also possible, as already described further above, to add the steering column switch in that, e.g., the housing bottom of the steering angle sensor forms the housing lid of the steering column switch.

What is claimed is:

1. An integrated sub-assembly installable on a steering column or steering wheel of an automotive vehicle, the subassembly comprising:

a housing lid;

a housing bottom cooperating with said housing lid; and housing walls cooperating with said housing lid and said housing bottom to define a first housing space for a steering angle sensor and a second housing space for an electric power transmission unit, wherein a portion of at least one of said housing lid, said housing bottom and said housing walls is disposed between, separates and borders both said first housing space and said second housing space, wherein said housing lid, said housing bottom, and said housing walls define a central opening in the housing and further comprising a code disk rotatably mounted in said first housing space, said code disk having at least one transport eyelet projecting into said central opening, said housing lid having means cooperating with a steering column or steering wheel for secure mutual rotation of said housing lid together with the steering wheel or steering column, said housing lid also having at least one transport tongue cooperating with said transport eyelet for secure mutual rotation of said code disk together with the steering wheel or steering column.

2. The sub-assembly of claim 1, wherein said first housing space and said second housing space are each annular in shape, and further comprising means for latched connection of said housing lid to said housing bottom.

3. The sub-assembly of claim 1, further comprising a steering column switch housing mounted to at least one of said housing lid, said housing bottom and said housing walls.

4. The sub-assembly of claim 3, further comprising a drive segment coupled between said steering wheel and at least two of said first housing space, said second housing space and said steering column switch housing.

5. The sub-assembly of claim 1, wherein said housing lid is configured as a code disk having a track for determination of an angle of rotation of the steering wheel.

* * * * *